(12) United States Patent
Choo et al.

(10) Patent No.: US 8,391,274 B2
(45) Date of Patent: Mar. 5, 2013

(54) DATA CALL TERMINATING SERVICE SYSTEM AND METHOD FOR DYNAMIC IP OF MOBILE COMMUNICATION TERMINAL

(75) Inventors: Ho-Cheol Choo, Yangcheon-Gu (KR); Seok-Joon Jang, Dobong-Gu (KR)

(73) Assignee: Pantech&Curitel Communications, Inc., Seoul (KR)

( * ) Notice: Subject to any disclaimer, the term of this patent is extended or adjusted under 35 U.S.C. 154(b) by 1761 days.

(21) Appl. No.: 11/263,953

(22) Filed: Nov. 2, 2005

(65) Prior Publication Data

US 2006/0126600 A1 Jun. 15, 2006

(30) Foreign Application Priority Data

Dec. 10, 2004 (KR) ........................ 10-2004-0104423

(51) Int. Cl.
*H04L 12/66* (2006.01)
*H04L 12/28* (2006.01)
*H04J 3/24* (2006.01)

(52) U.S. Cl. ........ 370/352; 370/349; 370/389; 370/392; 370/395.3

(58) Field of Classification Search ............... 455/435.1, 455/436–444; 370/349, 395.3
See application file for complete search history.

(56) References Cited

U.S. PATENT DOCUMENTS

| | | | |
|---|---|---|---|
| 6,201,965 B1 * | 3/2001 | Mizell et al. | 455/433 |
| 6,731,735 B1 * | 5/2004 | Cook | 379/207.11 |
| 7,228,359 B1 * | 6/2007 | Monteiro | 709/245 |
| 7,567,804 B1 * | 7/2009 | Mangal | 455/435.1 |
| 2001/0034767 A1 * | 10/2001 | Aho | 709/206 |
| 2002/0061756 A1 * | 5/2002 | Bleckert et al. | 455/458 |
| 2002/0118656 A1 * | 8/2002 | Agrawal et al. | 370/329 |
| 2003/0039241 A1 * | 2/2003 | Park et al. | 370/352 |
| 2003/0212774 A1 * | 11/2003 | Lee et al. | 709/222 |
| 2004/0137888 A1 * | 7/2004 | Ohki | 455/417 |
| 2004/0176128 A1 * | 9/2004 | Grabelsky et al. | 455/553.1 |
| 2005/0136898 A1 * | 6/2005 | Shaheen et al. | 455/414.1 |
| 2005/0195836 A1 * | 9/2005 | Greenspan et al. | 370/401 |
| 2006/0013157 A1 * | 1/2006 | Annic | 370/328 |

FOREIGN PATENT DOCUMENTS

| | | |
|---|---|---|
| KR | 2002-0041105 | 6/2002 |
| KR | 2003-0083428 | 10/2003 |
| KR | 10-2004-0026891 | 4/2004 |
| KR | 2004-0029594 | 4/2004 |
| KR | 2004-0085644 | 10/2004 |

* cited by examiner

*Primary Examiner* — Chandrahas Patel
*Assistant Examiner* — Joel Hamel
(74) *Attorney, Agent, or Firm* — H.C. Park & Associates, PLC

(57) ABSTRACT

Disclosed is a data call terminating service system and method for a dynamic IP of a mobile communication terminal. The method includes the steps of: a) transmitting, from a DNS to a call terminating server, access request information about a request of access to a URL designating a specific mobile communication terminal from an external host; b) acquiring, at the call terminating server having received the access request, a phone number of the mobile communication terminal corresponding to the URL contained in the received access request information by making reference to a database; c) requesting, at the call terminating server, data call establishment from the mobile communication terminal after acquiring location information of the mobile communication terminal corresponding to the phone number acquired in step b) through HLR; and d) notifying, at the call terminating server, the DNS and the external host of IP assignment information received from the mobile communication terminal having established the data call.

10 Claims, 4 Drawing Sheets

DATA CALL TERMINATING SERVICE SYSTEM AND METHOD FOR DYNAMIC IP OF MOBILE COMMUNICATION TERMINAL

BACKGROUND OF THE INVENTION

This application claims the priority of Korean Patent Application No. 2004-104423, filed on Dec. 10, 2004, in the Korean Intellectual Property Office, the disclosure of which is incorporated herein in its entirety by reference.

1. Field of the Invention

The present invention relates to a data call terminating service system and method for a dynamic IP (Internet Protocol) of a mobile communication terminal and, more particularly, to a technology for providing a data call terminating service using a dynamically assigned IP address of a mobile communication terminal.

2. Description of Related Art

Korean Unexamined Patent Application No. 2004-0026891 (Apr. 1, 2004) discloses a call terminating service method for a dynamic IP in an asynchronous mobile communication network (3GPP).

According to this method, GGSN (Gateway GPRS Support Node) of the asynchronous mobile communication network (3GPP) includes an inbound call controller, an IP management unit, a session management unit, and a dynamic domain name service (DDNS) server (which may be provided separately from the GGSN). The DDNS server checks whether or not there exists an IP corresponding to a domain name contained in an IP request message transmitted from a host. If it does not exist, the DDNS server sends an IP assignment request message to the inbound call controller. The inbound call controller transmits an IP reservation request message to the IP management unit. Upon receiving the IP reservation request message, the IP management unit reserves an IP and sends the IP to the inbound call controller. The inbound call controller sends the reserved IP to the DDNS server and acquires through HLR (Home Location Register) an address of SGSN (Serving GPRS Support Node) to which a subscriber belongs. The DDNS server transmits a response message containing the reserved IP to the host. Upon receiving the response message, the host sets the reserved IP as a destination and transmits traffic data to the GGSN to provide a data call terminating service.

Meanwhile, Korean Unexamined Patent Application No. 2002-0041105 (Jun. 1, 2002) discloses a call terminating service method for a dynamic IP in a synchronous mobile communication network (3GPP2).

According to this method, when an IP address of a mobile communication terminal is changed in a wireless communication system, HA (home agent) transmits a DNS update message to automatically register the changed IP address in place of the mobile communication terminal. As a result, a mobile IP terminal can use a call terminating service without updating the changed IP address to a DNS server or a website.

However, the method disclosed in Korean Unexamined Patent Application No. 2004-0026891 can be applied to an asynchronous mobile communication network (3GPP) but cannot be applied to a synchronous mobile communication network (3GPP2). Meanwhile, the method disclosed in Korean Unexamined Patent Application No. 2002-0041105 can be applied to a synchronous mobile communication network (3GPP2) but cannot be applied to an asynchronous mobile communication network (3GPP).

Further, the above-mentioned two methods can provide the call terminating service to a mobile communication terminal in an active state or a dormant state, but cannot provide it to a mobile communication terminal in an idle state.

The active state implies a state in which a traffic channel and a PPP session are established. The dormant state implies a state in which a PPP session is established but a traffic channel is not established. In these two states, since a connection for data transfer can be established between a mobile communication terminal and a mobile communication system, the mobile communication system can transfer data to the mobile communication terminal. Accordingly, the conventional methods can be applied to a mobile communication terminal in the active state or the dormant state. However, in case of the idle state where a traffic channel and a PPP session are not established, since the mobile communication system cannot request a data call connection from the mobile communication terminal (that is because the data call connection is established by request of the mobile communication terminal), the above-mentioned conventional methods cannot be applied to a mobile communication terminal in the idle state.

In case of VoIP (Voice over IP) service, for example, when a mobile communication terminal attempts to make a VoIP call origination to a mobile communication system, the VoIP service cannot be provided to a mobile communication terminal in an idle state from an external host.

SUMMARY OF THE INVENTION

The present invention provides a data call terminating service system and method for a dynamic IP of a mobile communication terminal, which is capable of being applied both to asynchronous (3GPP) and to synchronous (3GPP2) mobile communication networks. Further, the present invention provides a data call terminating service system and method for a dynamic IP of a mobile communication terminal, which is capable of providing a data call terminating service to the mobile communication terminal in an idle state as well as in an active state or a dormant state.

According to an aspect of the present invention, there is provided a data call terminating service system for a dynamic IP of a mobile communication terminal, comprising a call terminating server, wherein the call terminating server includes: an access request information receiver for receiving, through a DNS, access request information about a request of access to a URL designating a specific mobile communication terminal from an external host; a phone number acquisition unit for acquiring a phone number of the mobile communication terminal corresponding to the URL contained in the access request information received by the access request information receiver by making reference to a database; a data call establishment requester for acquiring, through HLR, location information of the mobile communication terminal corresponding to the phone number acquired by the phone number acquisition unit, and for requesting data call establishment from the mobile communication terminal; an IP assignment information receiver for receiving IP assignment information from the mobile communication terminal having established the data call; and an IP assignment information transmitter for transmitting the IP assignment information received by the IP assignment information receiver to the DNS and the external host.

The data call establishment requester may request data call establishment by transmitting to the mobile communication terminal a short message or a page signal for requesting the data call establishment.

The URL designating the mobile communication terminal may include a phone number of the mobile communication terminal.

The call terminating server may be interworked with a synchronous (3GPP2) or an asynchronous (3GPP) mobile communication network.

According to another aspect of the present invention, there is provided a data call terminating service method for a dynamic IP of a mobile communication terminal, the method comprising the steps of: a) transmitting, from a DNS to a call terminating server, access request information about a request of access to a URL designating a specific mobile communication terminal from an external host; b) acquiring, at the call terminating server having received the access request, a phone number of the mobile communication terminal corresponding to the URL contained in the received access request information by making reference to a database; c) requesting, at the call terminating server, data call establishment from the mobile communication terminal after acquiring location information of the mobile communication terminal corresponding to the phone number acquired in step b) through HLR; and d) notifying, at the call terminating server, the DNS and the external host of IP assignment information received from the mobile communication terminal having established the data call.

The method may further comprise the step of: e) requesting, at the external host, an access to a URL designating a specific mobile communication terminal from the DNS.

The method may further comprise the steps of: f) acquiring an IP from a mobile communication system after the mobile communication terminal having received the data call establishment request transmitted in the step c) requests data call establishment from the mobile communication system and a data call is connected between the mobile communication terminal and the mobile communication system; and g) transmitting IP assignment information acquired in the step f) from the mobile communication terminal to the call terminating server.

In the step c), the data call establishment may be requested by allowing the call terminating server to transmit a short message or a page signal for requesting the data call establishment to the mobile communication terminal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
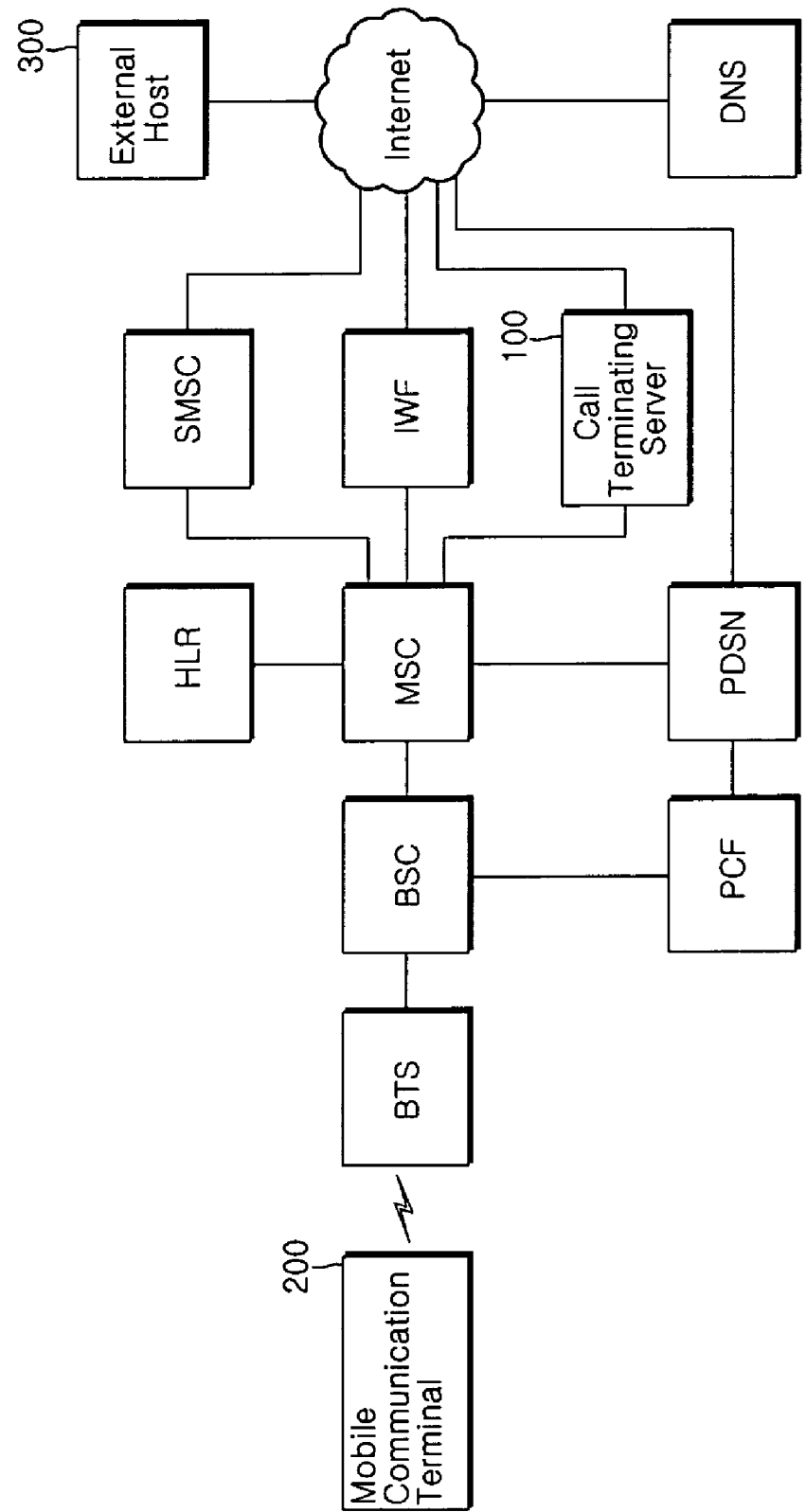
FIGS. 1A and 1B are block diagrams showing a data call terminating service system for a dynamic IP of a mobile communication terminal in accordance with the present invention.

Exemplary embodiments in accordance with the present invention will now be described in detail with reference to the accompanying drawings wherein like reference numerals designate like elements throughout the description.

Figure 1B:
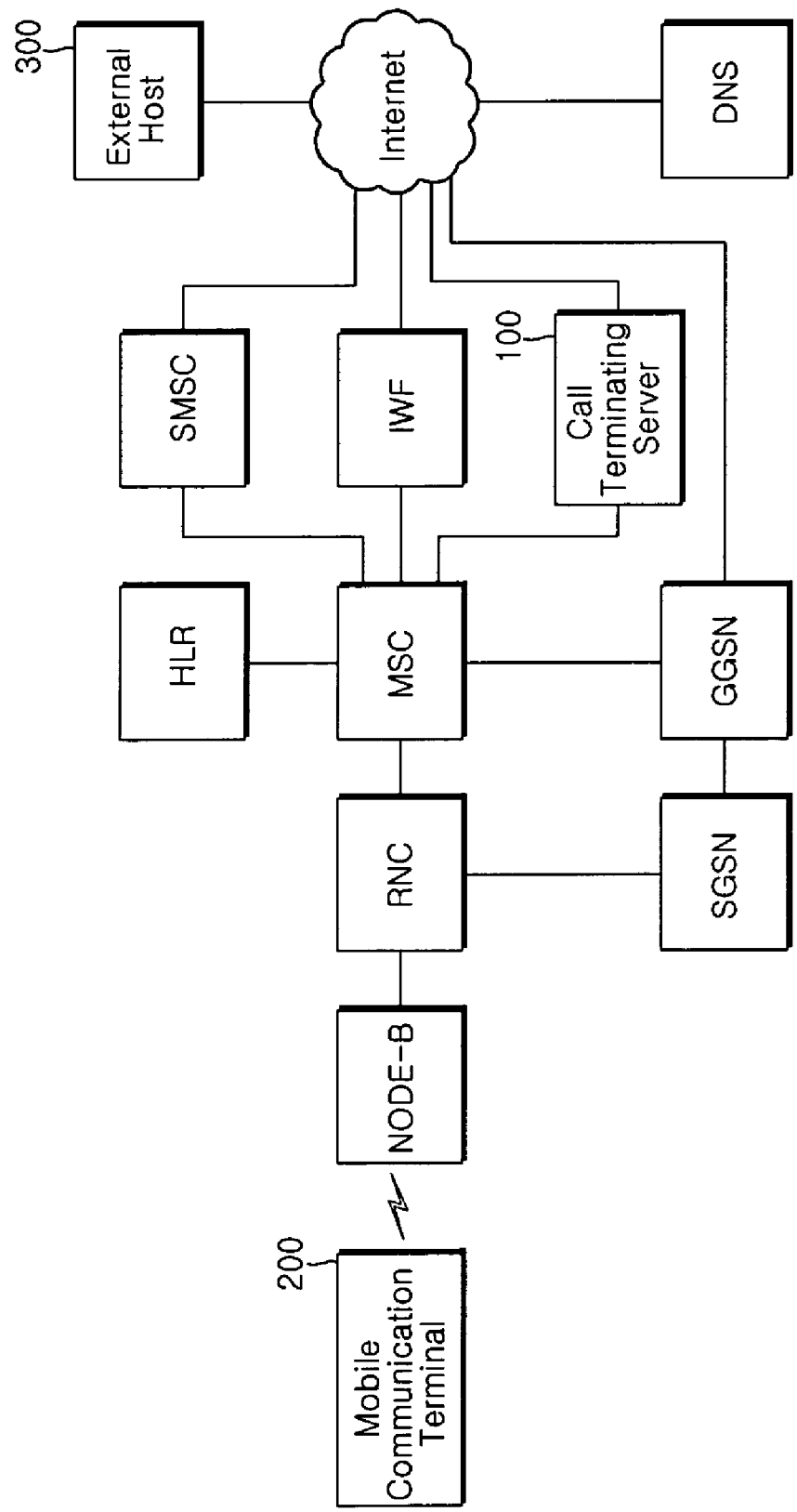

FIGS. 1A and 1B are block diagrams showing a data call terminating service system for a dynamic IP of a mobile communication terminal in accordance with the present invention.

FIG. 1A shows a synchronous mobile communication network (3GPP2) interworked with a data call terminating service system for a dynamic IP of a mobile communication terminal in accordance with the present invention. FIG. 1B shows an asynchronous mobile communication network (3GPP) interworked with a data call terminating service system for a dynamic IP of a mobile communication terminal in accordance with the present invention.

The data call terminating service system according to the present invention comprises a call terminating server 100 which is connected to a mobile switching center (MSC) of a synchronous (3GPP2) or an asynchronous (3GPP) mobile communication network. The call terminating server 100 receives access request information about a request of access to a URL indicating a specific mobile communication terminal from an external host through a domain name server (DNS), acquires a phone number of the mobile communication terminal corresponding to the URL contained in the access request information by making reference to a database, acquires the location of the mobile communication terminal corresponding to the acquired phone number through a home location register (HLR), requests data call establishment from the mobile communication terminal, receives IP assignment information from the mobile communication terminal which have established the data call, and transfers the IP assignment information to the DNS and the external host.

The synchronous (3GPP2) mobile communication network shown in FIG. 1A, which includes BTS (base transceiver station), BSC (base station controller), MSC, IWF (interworking function), HLR, SMSC (short message service center), PCF (packet control function), and PDSN (packet data serving node), and the asynchronous (3GPP) mobile communication network shown in FIG. 1B, which includes NODE-B, RNC (radio network controller), MSC, IWF, HLR, SMSC, SGSN, and GGSN, are well-known in the art and a detailed description thereof will thus be omitted herein.

Figure 2:
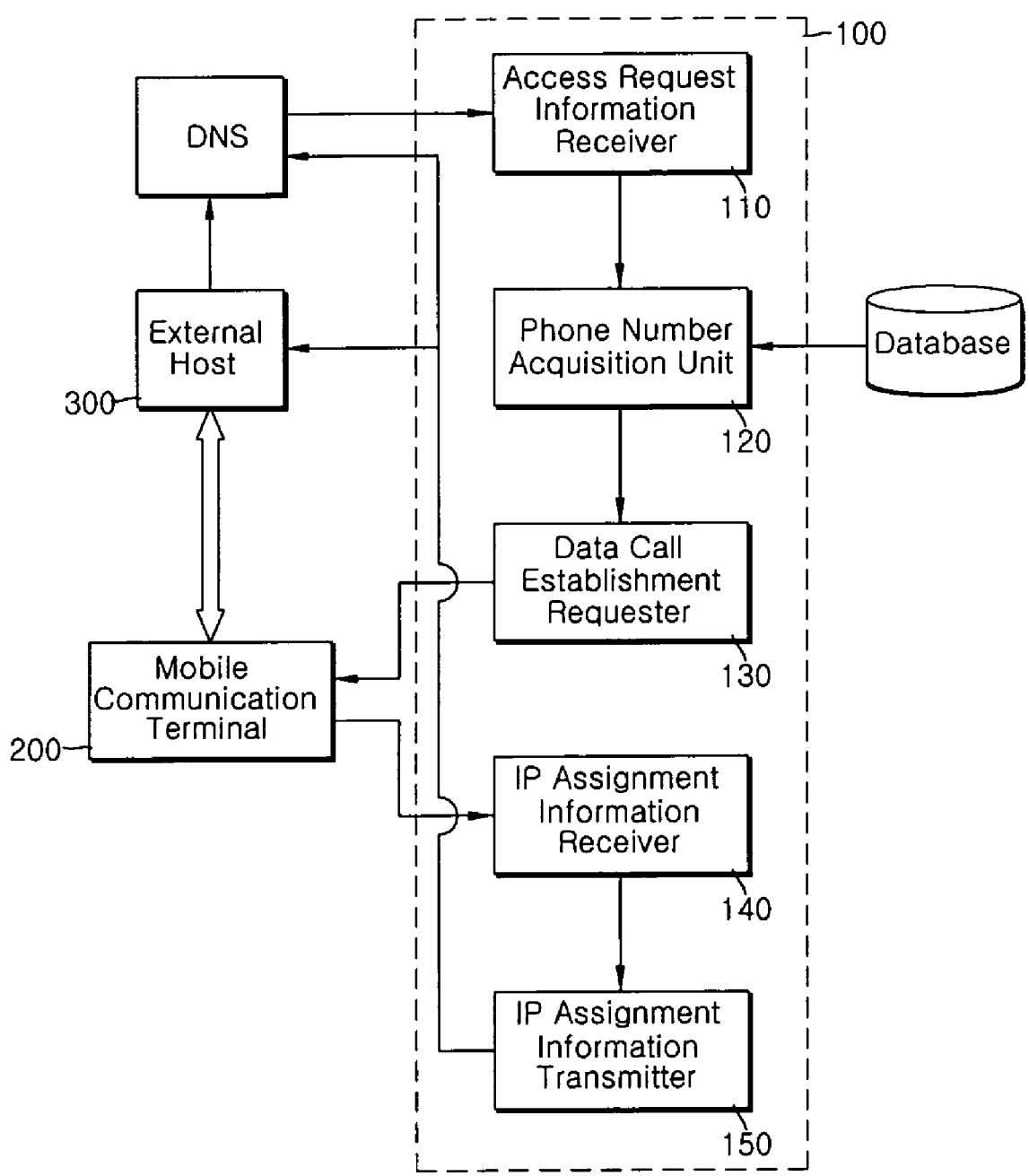
FIG. 2 is a block diagram showing a data call terminating service system for a dynamic IP of a mobile communication terminal in accordance with an embodiment of the present invention.

FIG. 2 is a block diagram showing a data call terminating service system for a dynamic IP of a mobile communication terminal in accordance with an embodiment of the present invention.

The call terminating server 100 comprises an access request information receiver 110, a phone number acquisition unit 120, a data call establishment requester 130, an IP assignment information receiver 140, and an IP assignment information transmitter 150.

The access request information receiver 110 receives access request information about a request of access to a URL designating a specific mobile communication terminal 200 from an external host 300 through the DNS.

At this time, the URL designating the mobile communication terminal 200 preferably contains a phone number of the mobile communication terminal 200.

When the external host 300, such as personal computer, mobile station, or personal digital assistant (PDA), connected to wireline/wireless Internet accesses to a mobile communication terminal 200 providing a data service, the external host 300 requests an IP address of the mobile communication terminal 200 from the DNS since the external host 300 cannot know the IP address assigned to the mobile communication terminal 200.

Conventionally, if the mobile communication terminal 200 is in an idle state, it is not possible to provide a data call terminating service since the external host 300 does not know the IP address of the mobile communication terminal 200.

According to the present invention, each mobile communication terminal is first assigned a unique URL for data call terminating, and then the URLs assigned to each mobile communication terminal and phone numbers of the mobile communication terminals corresponding to the URLs are stored in a database in the call terminating server 100.

At this time, each mobile communication terminal may be assigned a unique URL containing its phone number, for example, www.01190110011.sktelecom.com.

When the external host 300 attempts to access a URL assigned to a specific mobile communication terminal, access request information is sent to DNS to acquire an IP address of the mobile communication terminal corresponding to the URL.

Next, the DNS relays the access request information about a request of access to the URL designating the mobile communication terminal 200 from the external host 300 to the call terminating server 100 to acquire an IP address mapped to the URL.

The call terminating server 100 receives through the access request information receiver 110 the access request information about a request of access to the URL designating the mobile communication terminal 200 from the external host 300.

The phone number acquisition unit 120 acquires the phone number of the mobile communication terminal 200 corresponding to the URL contained in the access request information received in the access request information receiver 110 by making reference to the database.

As described above, since the call terminating server 100 includes the database having URLs of each mobile communication terminal and phone numbers of the mobile communication terminals corresponding to the URLS, the call terminating server 100 having received the access request information acquires the phone numbers of the mobile communication terminals corresponding to the URLs contained in the access request information received through the phone number acquisition unit 120 by making reference to the database.

The data call establishment requester 130 acquires location information about the mobile communication terminal 200 corresponding to the phone number acquired by the phone number acquisition unit 120 through HLR, and requests data call establishment from the mobile communication terminal 200.

That is, the call terminating server 100 having acquired the phone number of the mobile communication terminal 200 corresponding to the URL contained in the received access request information requests and receives the location information about the mobile communication terminal 200 corresponding to the phone number in HLR, and requests data call establishment from the corresponding mobile communication terminal 200 through the data call establishment requester 130 on the basis of the location information.

At this time, the data call establishment requester 130 preferably transmits a short message for requesting data call establishment to the mobile communication terminal 200 through a short message service center (SMSC), or through a page signal which a base station sends periodically to a mobile communication terminal through a paging channel.

The IP assignment information receiver 140 receives IP assignment information from the corresponding mobile communication terminal 200 having established a data call.

That is, the mobile communication terminal 200 having received data call establishment request requests data call connection from a mobile communication system, whereby a data call is connected between the mobile communication system and the mobile communication terminal in an idle state, differently from the prior art. In case of a synchronous (3GPP2) mobile communication network, when the mobile communication terminal requests the data call connection, a traffic channel is assigned by the mobile communication system, a PPP session is connected, and an IP assignment procedure is performed. Meanwhile, in case of an asynchronous (3GPP) mobile communication terminal, when the mobile communication terminal requests the data call connection, a mobile communication system performs PDP context creation and IP assignment procedures. The above-mentioned data call connection procedures are well-known in the art and a detailed description thereof will thus be omitted herein.

When a data call is connected and an IP is assigned by the mobile communication system, the mobile communication terminal 200 transmits IP assignment information to the call terminating server 100. The call terminating server 100 receives the IP assignment information from the corresponding mobile communication terminal 200 through the IP assignment information receiver 140.

The IP assignment information transmitter 150 transmits the IP assignment information received by the IP assignment receiver 140 to the DNS and the corresponding external host 300.

That is, the call terminating server 100 having received the IP assignment information from the corresponding mobile communication terminal 200 transmits the IP assignment information received through the IP assignment information transmitter 150 to the DNS. At this time, the IP assignment information is contained in a dynamic update message for updating IP information about URL of the corresponding mobile communication terminal and then transmitted.

In addition, the call terminating server 100 having received the IP assignment information from the corresponding mobile communication terminal 200 transmits response information including the IP assignment information having been received through the IP assignment transmitter 150 to the corresponding external host 300 in response to the access request. As a result, the external host 300 acquires an IP address corresponding to the URL of the corresponding mobile communication terminal, and accesses the mobile communication terminal using the acquired IP address over TCP/UDP/IP communication. Thus, data communication is made possible between the external host 300 and the mobile communication terminal.

Accordingly, the present invention can be adapted both to the asynchronous (3GPP) and synchronous (3GPP2) mobile communication networks. In addition, according to the present invention, providing a data call terminating service is made possible in a mobile communication terminal in an idle state as well as in an active state or a dormant state.

Figure 3:
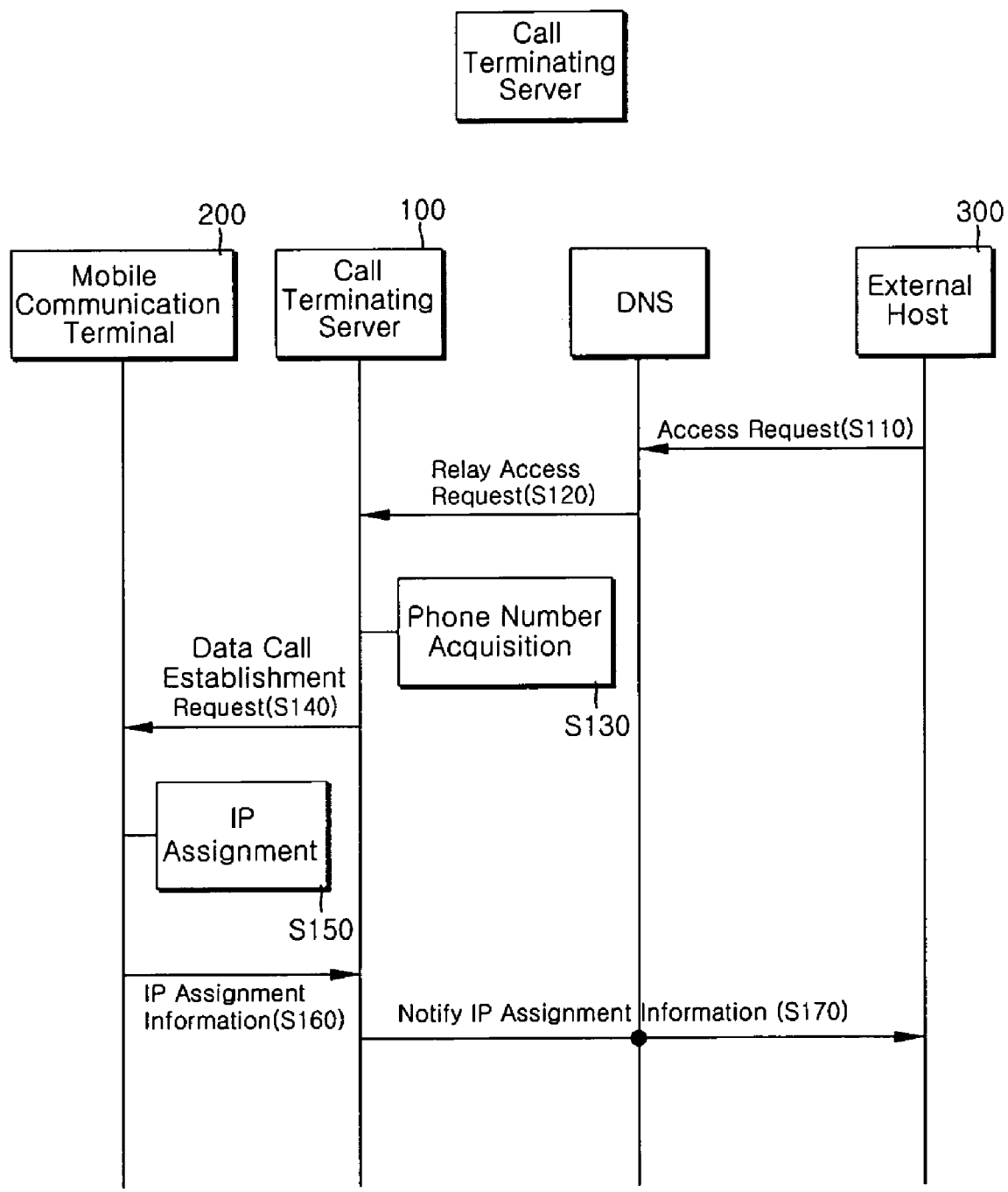
FIG. 3 is a flow chart showing a data call terminating service method for a dynamic IP of a mobile communication terminal in accordance with an embodiment of the present invention.

FIG. 3 is a flow chart showing a data call terminating service method for a dynamic IP of a mobile communication terminal in accordance with an embodiment of the present invention.

It is assumed that each mobile communication terminal is assigned a unique URL (which preferably includes a phone number of a corresponding mobile communication terminal) for data call terminating, and a call terminating server 100 stores a database including the URLs assigned to each mobile communication terminal and phone numbers of mobile communication terminals corresponding to the URLs.

First, in step S110, the external host 300 requests access to a URL designating a specific mobile communication terminal from a DNS.

In step S120, the DNS transmits a request of the access to the URL designating the specific mobile communication terminal from the external host 300 to the call terminating server 100.

In step S130, the call terminating server 100 having received the access request through the access request information receiver 110 acquires a phone number of the mobile communication terminal corresponding to the URL contained in access request information received through the phone number acquisition unit 120 by making reference to the database.

In step S140, the call terminating server 100 acquires location information of the mobile communication terminal corresponding to the phone number acquired in the step S130 through HLR, and requests data call establishment from the corresponding mobile communication terminal 200 through the data call establishment requester 130. At this time, the call terminating server 100 preferably requests data call establishment by transmitting a short message or a page signal for requesting data call establishment to the corresponding mobile communication terminal 200.

In step S150, the mobile communication terminal 200 having received the data call establishment request in step S140 requests data call establishment from a mobile communication system, a data call is connected between the mobile communication terminal 200 and the mobile communication system, and the mobile communication system assigns an IP to the mobile communication terminal 200.

In step S160, the mobile communication terminal 200 transmits the IP assignment information assigned in step S150 to the call terminating server 100.

In step S170, the call terminating server 100 having received the IP assignment information through the IP assignment information receiver 140 from the mobile communication terminal 200 having established the data call transmits the received IP assignment information to the DNS and the corresponding external host 300.

Subsequently, the DNS having received the IP assignment information from the call terminating server 100 updates IP information corresponding to the URL of the corresponding mobile communication terminal 200. The external host 300 having received the IP assignment information from the call terminating server 100 acquires the IP address corresponding to the URL of the corresponding mobile communication terminal 200, and accesses to the acquired IP address over TCP/UDP/IP communication. Thus, data communication is made possible between the external host 300 and the mobile communication terminal 200.

As apparent from the above description, the present invention can be applied both to the asynchronous (3GPP) and synchronous (3GPP2) mobile communication network. Further, the present invention can provide a data call terminating service to the mobile communication terminal in an idle state as well as in an active state or a dormant state.

While the present invention has been described with reference to exemplary embodiments thereof, it will be understood by those skilled in the art that various changes in form and details may be made therein without departing from the scope of the present invention as defined by the following claims.

What is claimed is:

1. A data call terminating service system for a dynamic IP (internet protocol) of a mobile communication terminal, comprising a call terminating server, wherein the call terminating server comprises:

an access request information receiver to receive, through a DNS (domain name server), access request information about a request of access to a HTTP URL (hypertext transfer protocol uniform resource locator) designating a specific mobile communication terminal from an external host, wherein the external host resides outside of a mobile network;

a phone number acquisition unit to acquire a phone number of the mobile communication terminal corresponding to the HTTP URL contained in the access request information received by the access request information receiver by making reference to a database;

a data call establishment requester to acquire, through HLR (home location register), location information of the mobile communication terminal corresponding to the phone number acquired by the phone number acquisition unit, and to request data call establishment from the mobile communication terminal;

an IP assignment information receiver to receive IP assignment information from the mobile communication terminal having established the data call;

an IP assignment information transmitter to transmit the IP assignment information received by the IP assignment information receiver to the DNS and the external host; and wherein the HTTP URL designating the mobile communication terminal includes a phone number of the mobile communication terminal.

2. The data call terminating service system of claim 1, wherein the data call establishment requester requests data call establishment by transmitting a short message to request the data call establishment to the mobile communication terminal.

3. The data call terminating service system of claim 1, wherein the data call establishment requester requests data call establishment by transmitting a page signal to request the data call establishment to the mobile communication terminal.

4. The data call terminating service system of any one of claims 1 to 3, wherein the call terminating server is interworked with a synchronous (3GPP2) mobile communication network.

5. The data call terminating service system of any one of claims 1 to 3, wherein the call terminating server is interworked with an asynchronous (3GPP) mobile communication network.

6. A data call terminating service method for a dynamic IP (internet protocol) of a mobile communication terminal, the method comprising the steps of:

a) transmitting, from a DNS (domain name server) to a call terminating server, access request information about a request of access to a HTTP URL (hypertext transfer protocol uniform resource locator) designating a specific mobile communication terminal from an external host, wherein the external host resides outside of a mobile network;

b) acquiring, at the call terminating server having received the access request, a phone number of the mobile communication terminal corresponding to the HTTP URL contained in the received access request information by making reference to a database;

c) requesting, at the call terminating server, data call establishment from the mobile communication terminal after acquiring location information of the mobile communication terminal corresponding to the phone number acquired in step b) through HLR (home location register);

d) notifying, at the call terminating server, the DNS and the external host of IP assignment information received from the mobile communication terminal having established the data call; and wherein the HTTP URL designating the mobile communication terminal includes a phone number of the mobile communication terminal.

7. The method of claim 6, further comprising the step of: e) requesting, at the external host, an access to a HTTP URL designating a specific mobile communication terminal from the DNS.

8. The method of claim 7, further comprising the steps of:

f) acquiring an IP from a mobile communication system after the mobile communication terminal having received the data call establishment request transmitted in the step c) requests data call establishment from the mobile communication system and a data call is connected between the mobile communication terminal and the mobile communication system; and g) transmitting IP assignment information acquired in the step f) from the mobile communication terminal to the call terminating server.

9. The method of any one of claims 6 to 8, wherein in the step c), the data call establishment is requested by allowing the call terminating server to transmit a short message for requesting the data call establishment to the mobile communication terminal.

10. The method of any one of claims 6 to 8, wherein in the step c), the data call establishment is requested by allowing the call terminating server to transmit a page signal for requesting the data call establishment to the mobile communication terminal.

\* \* \* \* \*